G. F. & C. C. ANNIS.
AUTOMOBILE TIRE.
APPLICATION FILED MAY 9, 1908.
962,729.
Patented June 28, 1910.
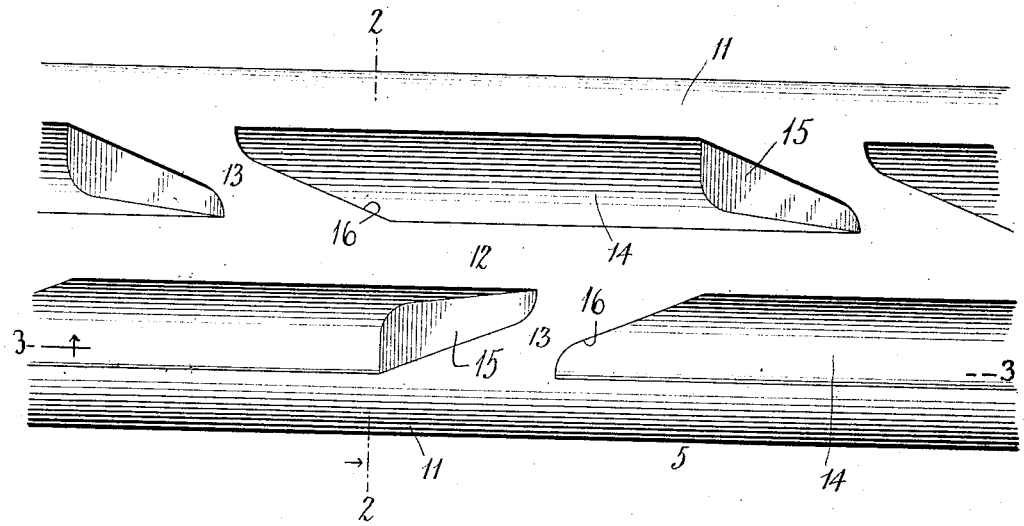
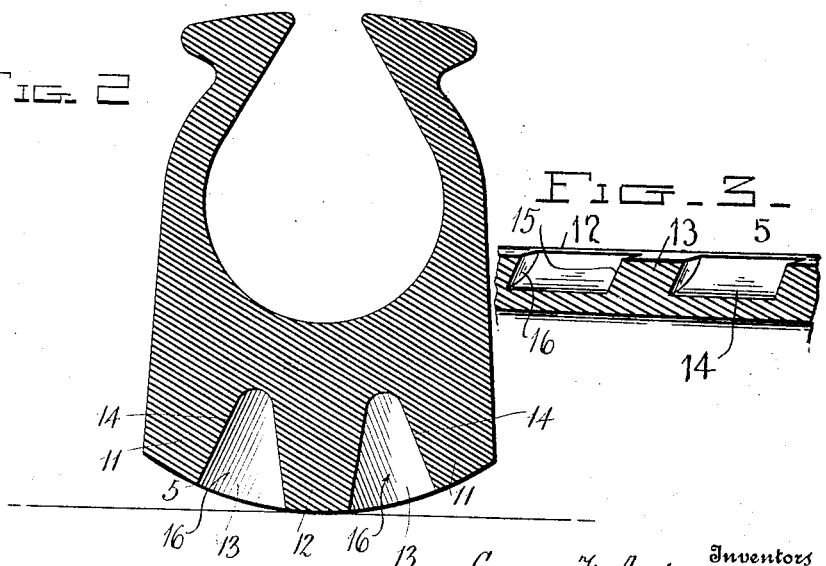
Witnesses
Inventors
George F. Annis and
Charles C. Annis,
By Chandler & Chandler
Attorneys

UNITED STATES PATENT OFFICE.

GEORGE F. ANNIS AND CHARLES C. ANNIS, OF FREEDOM, OKLAHOMA.

AUTOMOBILE-TIRE.

962,729. Specification of Letters Patent. Patented June 28, 1910.

Application filed May 9, 1908. Serial No. 431,883.

*To all whom it may concern:*

Be it known that we, GEORGE F. ANNIS and CHARLES C. ANNIS, citizens of the United States, residing at Freedom, in the county of Woods, State of Oklahoma, have invented certain new and useful Improvements in Automobile-Tires; and we do hereby declare the following to be a full, clear, and exact description of the invention, such as will enable others skilled in the art to which it appertains to make and use the same.

This invention relates to automobile tires and more specifically speaking the invention resides in the character of the tread surface of the tire.

The object of the invention is to provide a tire having its tread surface of such conformation that slipping or skidding of the tire or rather the wheel to which it is applied will be obviated and also to provide a tire having a tread so formed as to adapt the tire for travel over sandy and muddy roads.

Briefly described, the tire embodied in our invention has its tread surface formed with three peripheral ribs and at intervals with ribs which connect the side and intermediate peripheral ribs, these latter ribs being extended obliquely so as to crowd the sand or muddy soil toward the middle of the tire and pack it, the tire in this manner forming a solid surface over which to travel. Another novel feature of the invention resides in the fact that the intermediate peripheral rib is higher than the side peripheral ribs and is consequently compressed to a greater degree so that any mud which becomes packed in the grooves or recesses between the ribs will be dislodged by the expansion of the tire or in other words by the return of the said portion of the tire to normal condition.

In the accompanying drawings, Figure 1 is a plan view of a portion of a tire constructed in accordance with our invention, and Fig. 2 is a vertical transverse sectional view on the line 2—2 of Fig. 1. Fig. 3 is a longitudinal section on the line 3—3 of Fig. 1.

As shown in the drawings, we preferably embody our invention in a tire of the clencher type, the tread portion of the tire being indicated by the numeral 5.

The tread of the tire is slightly curved in general cross section and its sides are flat as is clearly shown in the cross sectional view of the drawings and the said tread is formed with three peripheral ribs, two of the ribs being indicated by the numeral 11 and the third by the numeral 12, the ribs 11 being located one to each side of the intermediate rib 12 and being equidistantly spaced from said rib. Connecting ribs 13 are also formed upon the tread 5 of the tire and these ribs 13 traverse the grooves 14, which grooves are formed between the side and intermediate ribs 11 and 12 and serve to connect the said ribs. The ribs 13 extend diagonally as is clearly shown in Fig. 1 of the drawings, the ribs to one side of the intermediate rib 12 being extended in a direction opposite to the direction of extent of the ribs to the other side of the said intermediate rib 12. Furthermore, the ribs 13 to each side of the intermediate rib 12 alternate and it will thus be seen that substantially parallelogrammic recesses are formed to each side of the intermediate rib 12 and between the said rib and the side ribs 11 and that these recesses alternate.

As clearly shown in the cross sectional view of the drawings, the rib 12 is of greater height than either of the ribs 11 and as the consequence this rib receives a greater part of the compression due to the weight placed upon the wheel, the expansion of the rib or in other words its return to normal position immediately after being compressed serving to dislodge any mud which might become caked in the recesses in the tread of the tire, the said recesses being in this manner automatically kept clear so as to at all times insure an effectual tread surface. It will be also understood in connection with the invention that slipping of the wheels in the direction of travel is obviated by the connecting ribs 13 and that side or lateral skidding is prevented by the peripheral ribs 11 and 12. These ribs 13 are furthermore so inclined that one end 15 of each recess 14 is beveled while the opposite end 16 is under-cut.

What is claimed is—

A tire having its tread surface formed with a plurality of parallel peripherally extending continuous ribs and obliquely extending ribs connecting the intermediate peripheral rib with the outside ribs, said obliquely extending ribs forming a series of pockets each having one end beveled and the other under-cut.

In testimony whereof, we affix our signatures, in presence of two witnesses.

GEORGE F. ANNIS.
CHARLES C. ANNIS.

Witnesses:
J. S. DICKASON,
MARGARET E. DICKASON.